(12) United States Patent
Wang et al.

(10) Patent No.: US 9,432,260 B2
(45) Date of Patent: Aug. 30, 2016

(54) AUTOMATED CONFIGURATION FOR NETWORK DEVICES

(71) Applicant: BROCADE COMMUNICATIONS SYSTEMS, INC., San Jose, CA (US)

(72) Inventors: Mike Lin Wang, Santa Clara, CA (US); Ravi Swamy, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 62 days.

(21) Appl. No.: 14/286,196

(22) Filed: May 23, 2014

(65) Prior Publication Data

US 2015/0280992 A1 Oct. 1, 2015

Related U.S. Application Data

(60) Provisional application No. 61/972,136, filed on Mar. 28, 2014.

(51) Int. Cl.
 *H04L 12/28* (2006.01)
 *H04L 12/24* (2006.01)
 *H04L 29/08* (2006.01)

(52) U.S. Cl.
 CPC ....... *H04L 41/0886* (2013.01); *H04L 41/0806* (2013.01); *H04L 69/324* (2013.01); *Y02B 60/43* (2013.01)

(58) Field of Classification Search
 CPC ....................................................... H04L 12/56
 USPC .......................... 370/257–401; 709/222–223
 See application file for complete search history.

(56) References Cited

U.S. PATENT DOCUMENTS

| 7,539,189 B2 * | 5/2009 | Sauter ................. H04L 63/0272 370/389 |
| 2013/0188634 A1 * | 7/2013 | Magee .................. H04L 12/462 370/389 |
| 2015/0081869 A1 * | 3/2015 | Wang ................... H04L 12/4633 709/223 |

OTHER PUBLICATIONS

Cisco Plug and Play Application Solutions Guide; Cisco Systems, Inc.; 2013; 53 pages.
Cisco Smart Install Configuration Guide; Cisco Systems, Inc.; Chapter 1; 2013; 16 pages.
Brocade: "FastIron Ethernet Switch"; Administration Guide; Supporting FastIron Software Release 08.0.00; dated Apr. 30, 2013, Brocade Communications, Inc.; 400 pages.

* cited by examiner

*Primary Examiner* — Iqbal Zaidi
(74) *Attorney, Agent, or Firm* — Fountainhead Law Group P.C.

(57) ABSTRACT

Techniques for automatically configuring a network device are provided. In one embodiment, the network device can receive a Layer 2 discovery packet on an uplink port operable for connecting the network device to another network device. The network device can then learn VLAN information from the Layer 2 discovery packet and automatically configure one or more of its ports based on the VLAN information.

20 Claims, 4 Drawing Sheets

AUTOMATED CONFIGURATION FOR NETWORK DEVICES

CROSS REFERENCES TO RELATED APPLICATIONS

The present application claims the benefit and priority under 35 U.S.C. 119(e) of U.S. Provisional Application No. 61/972,136, filed Mar. 28, 2014, entitled "AUTOMATED CONFIGURATION FOR NETWORK DEVICES." The entire contents of this provisional application are incorporated herein by reference for all purposes.

BACKGROUND

As known in computer networking, an "edge device" is a type of network device that interconnects a local area network (LAN) with a wide area network (WAN) or the Internet. For example, the LAN may include end-user devices such as PCs, mobile phones, wireless access points (AP), etc., and the WAN may be a corporate or service provider core network.

Typically, a significant number of edge devices need to be configured and deployed in a medium to large-sized organization. Thus, techniques that facilitate the configuration of such edge devices are highly desirable, since they can reduce the management burden on the organization's IT/network administrators.

Some network device vendors advertise their existing edge devices as supporting "auto-configuration." However, this auto-configuration feature merely enables the automatic download of a pre-set configuration file from a core switch/router to the edge device. Network administrators still need to prepare a configuration file for each individual edge device prior to download (since each edge device will be connected to different LANs/VLANs and require different port configurations). As a result, this solution does not appreciably reduce the management burden on the administrators.

SUMMARY

Techniques for automatically configuring a network device are provided. In one embodiment, the network device can receive a Layer 2 discovery packet on an uplink port operable for connecting the network device to another network device. The network device can then learn VLAN information from the Layer 2 discovery packet and automatically configure one or more of its ports based on the VLAN information.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Embodiments of the present invention provides techniques for automatically configuring network devices. Unlike existing "auto-configuration" implementations, the embodiments described herein allow a network administrator to simply plug the network device into an existing network and turn it on; the network device can then automatically configure itself for correct operation, without any further intervention or input by the administrator. Thus, this is a true "plug-and-play" solution that can dramatically simplify and streamline network device configuration/deployment in medium to large-sized organizations.

In the sections that follow, several of the described embodiments and examples pertain specifically to the automated configuration of Layer 2/3 edge devices (e.g., switches that are situated between host devices and core devices in a network). However, it should be appreciated that embodiments of the present invention may also be used to enable automated configuration of other types of network devices that are not edge devices, such as core switches or routers. One of ordinary skill in the art will recognize many variations, modifications, and alternatives.

1. Network Environment

Figure 1:
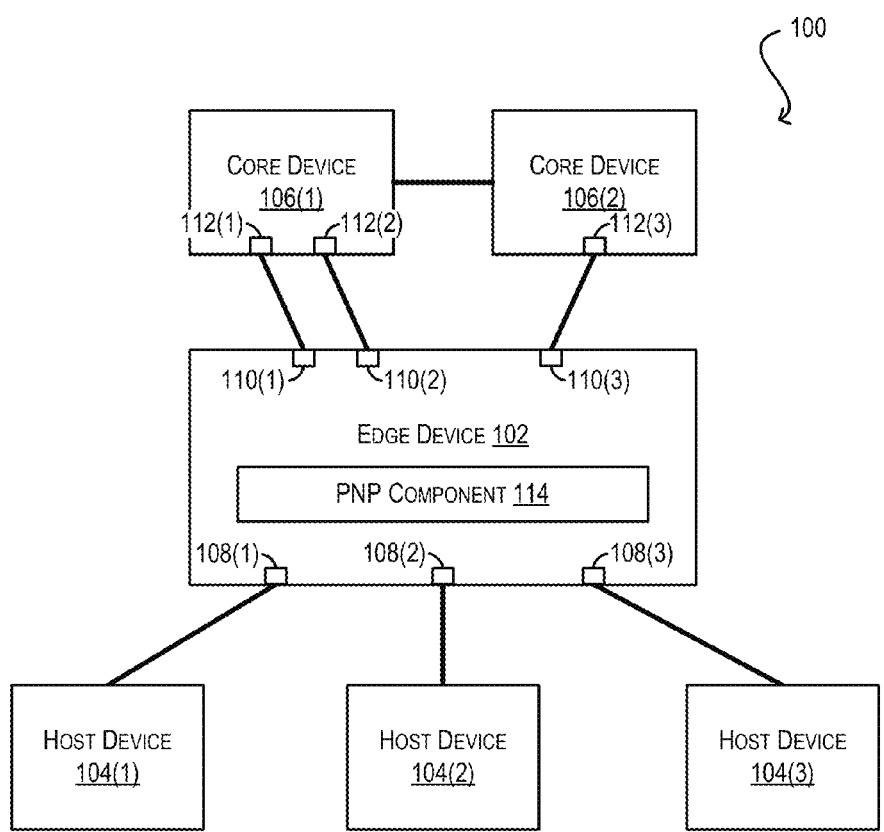
FIG. 1 depicts a network environment according to an embodiment.

FIG. 1 depicts a network environment 100 according to an embodiment. As shown, network environment 100 includes an edge device 102 that is communicatively coupled with a number of host devices 104(1), 104(2), and 104(3) and a number of core devices 106(1) and 106(2). In particular, edge device 102 is connected to host devices 104(1), 104(2), and 104(3) via edge ports 108(1), 108(2), and 108(3). Further, edge device 102 is connected to core devices 106(1) and 106(2) via uplink ports 110(1), 110(2), and 110(3), and core devices 106(1) and 106(2) are connected to edge device 102 via downlink ports 112(1), 112(2), and 112(3).

In one embodiment, edge device 102 can be a Layer 2 network switch. In another embodiment, edge device 102 can be a Layer 2/3 network router. Host devices 104(1)-104(3) can be end-user devices, such as PCs, mobile phones, wireless APs, and the like. Core devices 106(1) and 106(2) can be switches or routers that are part of an organization or service provider's core network. Although one edge device, three host devices, and two core devices are depicted in FIG. 1, it should be appreciated that any number of these devices may be supported based on, e.g., network requirements.

As noted the Background section, in organizational settings, typically a large number of edge devices need to be configured and deployed at the edges of the organization's core network. Merely by way of example, if the organization is a school district, edge devices may need to configured/deployed at each school within the district. Alternatively, if the organization is an enterprise, edge devices may need to configured/deployed at each office location of the enterprise. Due to the large number of edge devices, this configuration process can be a significant burden on the organization's network administrators.

To address this problem, edge device 102 of FIG. 1 can include a novel plug-and-play (PNP) component 114. In one embodiment, PNP component 114 can be implemented as software that is executed by a general purpose processor (CPU) of edge device 102. In alternative embodiments, PNP component 114 can be implemented as a combination of software and specialized hardware.

When edge device 102 is started (or in response to a user command), PNP component 114 can obtain VLAN information from core device 106(1) or 106(2). This VLAN information can include, e.g., VLAN IDs and VLAN types for VLANs that need to be supported by edge device 102, and can be received via a conventional Layer 2 discovery protocol (e.g., Foundry Discovery Protocol (FDP), Cisco Discovery Protocol (CDP), Link Layer Discovery Protocol (LLDP), or the like). Once obtained, PNP component 114 can leverage this VLAN information to automatically configure edge device 102. For instance, PNP component 114 can automatically create VLANs on edge device 102 based on the VLAN information, configure uplink ports 110(1)-110(3), provision/assign edge ports 108(1)-108(3) to the created VLANs, enable certain Layer 2 features (e.g., voice VLAN, dual-mode port, etc.), and more. In this way, edge device 102 can be made ready for use within the specific network environment it has been installed in, without any intervention or input from a user/administrator.

2. Automated Configuration Flow

Figure 2:
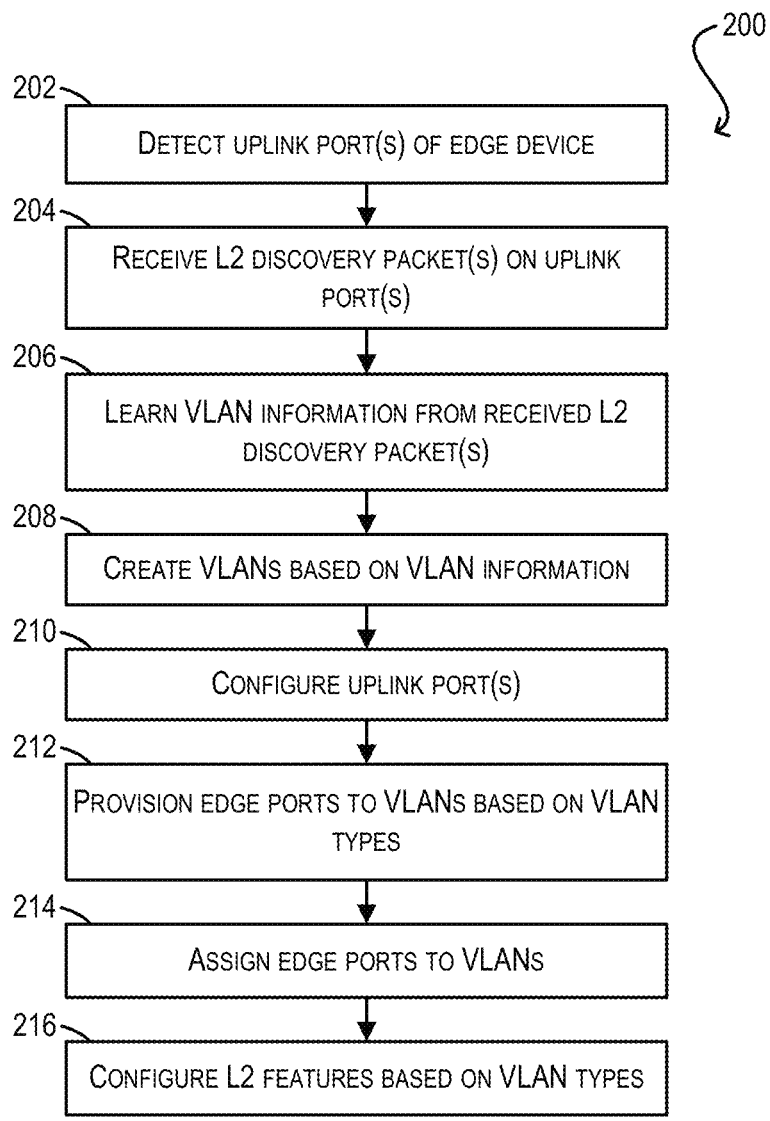
FIG. 2 depicts an automated network device configuration flow according to an embodiment.

To better illustrate the operation of PNP component 114, FIG. 2 depicts an automated configuration flow 200 that can be carried out by this component according to embodiment. Flow 200 can be performed in response to a particular event/command (e.g., upon device boot-up), or on a continuous basis during runtime of edge device 102.

Flow 200 assumes that core devices 106(1) and 106(2) of FIG. 1 (or some other network devices upstream from edge device 102) are enabled to transmit Layer 2 discovery packets that are formatted according to a conventional discovery protocol, such as LLDP, FDP, CDP, etc. Flow 200 further assumes that these Layer 2 discovery packets include VLAN information that edge device 102 can use to configure itself. For example, the VLAN information can comprise VLAN IDs and corresponding VLAN types that should be supported by edge device 102 in the context of network environment 100. In a particular embodiment, the VLAN types can be specified in the Layer 2 discovery packets via predefined keywords that are known to PNP component 114, such as "voice," "data," "wireless," and so on.

Starting with block 202 of flow 200, PNP component 114 can first detect one or more uplink ports of edge device 102 (e.g., uplink ports 110(1)-110(3) of FIG. 1). As used herein, an "uplink port" refers to a port that connects the edge device to another network device within (or towards) the network core, such as core devices 106(1) and 106(2). In some embodiments, the uplink ports may be grouped into one or more link aggregation groups (LAGs).

At block 204, PNP component 114 can receive Layer 2 discovery packets on the uplink port(s) detected at block 202. As noted previously, core devices 106(1) and 106(2) (or a different upstream device) can be configured to transmit such discovery packets as part of their normal operation.

At block 206, PNP component 114 can learn VLAN information from the received Layer 2 discovery packets. This VLAN information can include, e.g., VLAN IDs and corresponding VLAN types for VLANs that should be supported by edge device 102. For instance, Listing 1 below presents an example list of VLAN IDs and VLAN types that may be included in a received Layer 2 discovery packet:

VLAN ID: 100, VLAN TYPE: management
VLAN ID: 200, VLAN TYPE: voice
VLAN ID: 300, VLAN TYPE: wireless
VLAN ID: 400, VLAN TYPE: data
VLAN ID: 500, VLAN TYPE: data
Listing 1

The specific types of VLANs that can be recognized/learned by PNP component 114 may vary. Table 1 below presents an example list of VLAN types and their corresponding properties.

TABLE 1

| VLAN Type | Properties |
|---|---|
| Management | Used for managing the edge device; only needs to be assigned to uplink ports |
| Wireless | Used for connecting wireless APs, cameras, or other wireless host devices; generally needs to be assigned to a port that supports Power over Ethernet (PoE) and has inline-power enabled; generally needs to be assigned to an untagged port (i.e., it cannot be shared with other VLAN ports) |
| Voice | Used for connecting VoIP phones and other VoIP devices; generally needs to be assigned to a port that supports PoE and has voice-vlan enabled; generally needs to be assigned to an tagged port (i.e., it can be shared with data VLAN ports) |
| Data | Used to connect non-PoE devices, such as PCs, laptops, etc.; generally needs to be assigned to a port that has Spanning Tree Protocol-Bridge Protocol Data Unit (STP-BPDU) guard enabled to protected against loops; if it is assigned to a port that is also assigned a voice VLAN, the port should be configured as a tagged port and support dual-mode for untagged traffic; if it is assigned to a port that is not assigned to a voice VLAN, the port should be configured as a untagged port |

As discussed above, each of the VLAN types in Table 1 may be specified in the Layer 2 discovery packets via a predefined keyword (e.g., "voice," "data," wireless," etc.) so that PNP component 114 can recognize the VLAN type for configuration purposes.

Once PNP component 114 has learned the VLAN information included the received Layer 2 discovery packet(s) per block 206, PNP component 114 can perform various steps for automatically configuring edge device 102 based on that information (blocks 208-216). For instance, at block 208, PNP component 114 can automatically create VLANs on edge device 102 that correspond to the VLAN IDs/types identified in the learned VLAN information.

At block 210, PNP component 114 can configure uplink ports 110(1)-110(3) to properly communicate data and control traffic to core devices 106(1) and 106(2). For example, PNP component 114 can assign each uplink port to the VLANs identified in the learned VLAN information. PNP component 114 can also assign uplink ports 110(1)-110(3) to a management VLAN for managing edge device 102, and can detect misconfigurations on core devices 106(1) and 106(2).

At block 212, PNP component 114 can provision the edge ports of edge device 102 (e.g., 108(1)-108(3)) to the VLANs created at block 208 based on their VLAN types. In certain embodiments, this provisioning can take into account the hardware capabilities of each edge port and the features/properties required by each VLAN type. For instance, if edge port 108(3) does not support Power Over Ethernet (PoE), PNP component 114 can avoid including edge port 108(3) in a voice VLAN or wireless VLAN (if those VLANs are needed), since voice VLANs and wireless VLANs require PoE. One exemplary algorithm for performing this provisioning process is discussed in Section 3 below.

At block 214, PNP component 114 can assign edge ports to VLANs per the provisioning of block 212.

Finally, at block 216, PNP component 114 can configure certain Layer 2 features on edge device 102 based on the VLAN types. For example, PNP component 114 can enable dual mode operation on edge ports that have been assigned to a data VLAN. As another example, PNP component 114 can enable inline-power on edge ports that have been added to a voice VLAN or wireless VLAN. As another example, PNP component 114 can enable RSTP (Rapid Spanning Tree Protocol) with lowest priority on each VLAN. As another example, PNP component 114 can enable STP-BPDU guard on edge ports that that have been added to a data VLAN. As another example, PNP component 114 can enable dual-mode operation on edge ports that have been added to a data VLAN.

Once block 216 is complete, the edge device 102 can be fully (or almost fully) configured for use. In a particular embodiment, the administrator of edge device 102 can be made aware of the high-level logic used at block 212 for provisioning edge ports to VLANs. In this way, the administrator can know which edge ports should be used to plug-in host devices that corresponding to specific VLAN types (e.g., voice, wireless, etc.).

It should be appreciated that flow 200 is provided for illustrative purposes and is not intended to cover all possible configuration actions. Generally speaking, PNP component 114 can automatically perform any configuration that can be reasonably determined from the VLAN information included in the Layer 2 discovery packets received at block 204.

Further, although not shown in FIG. 2, after flow 200 has completed, PNP component 114 can cause edge device 102 to download a global configuration file from, e.g., a central management server. This global configuration file can include configuration settings that are universal across all of the edge devices in the organization's deployment. PNP component 114 can then cause the global configuration file to be applied to edge device 102. In the manner, PNP component 114 can automate both device-specific configuration (e.g., VLAN configuration) via flow 200 and device-agnostic configuration (e.g., user name, password, authentication type, server address(es), etc.) via the global configuration file.

Yet further, in certain embodiments, PNP component 114 can automatically re-configure edge device 102 in response to VLAN changes received (via Layer 2 discovery packets) from core devices 106(1) and 106(2). For instance, in one embodiment, PNP component 114 can automatically re-configure edge device 102 when VLANs are added or deleted. In another embodiment, PNP component 114 can automatically re-configure edge device 102 when the VLAN type for an existing VLAN changes. In still another embodiment, PNP component 114 can automatically detect and configure newly added uplink ports.

Yet further, flow 200 of FIG. 2 (or a variant thereof) may be used enable automated configuration in network devices that are not edge devices (for example, L2/L3 devices in the network core). In these embodiments, the steps that specifically relate to edge port provisioning can be removed/disabled, and flow 200 may solely perform configuration for the uplink port and/or a downlink port of the device.

3. Edge Port-VLAN Provisioning

Figure 3:
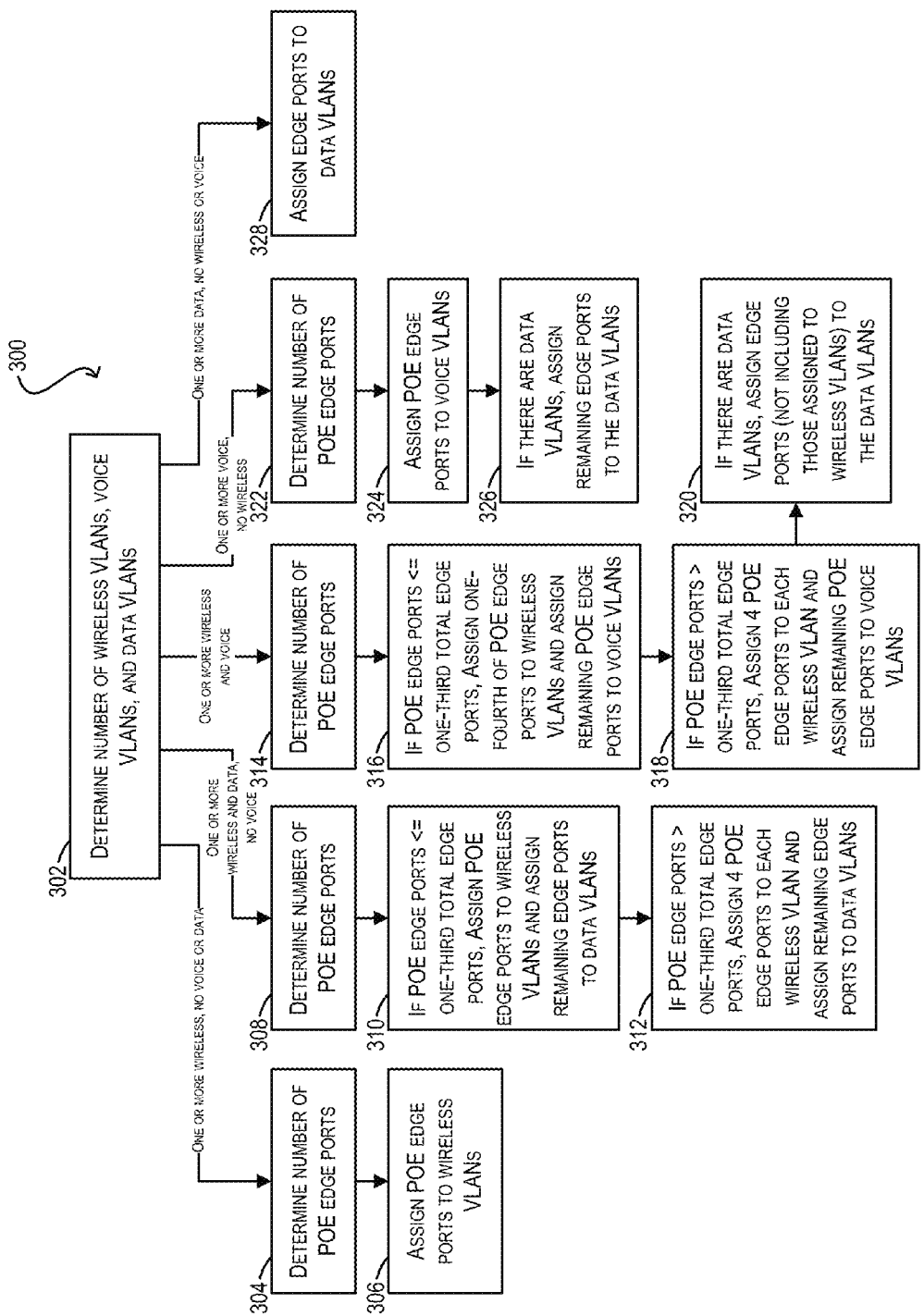
FIG. 3 depicts logic for provisioning edge ports to VLANs according to an embodiment.

As noted with respect to block 212 of FIG. 2, PNP component 114 can provision edge ports to VLANs in a manner that takes into account the hardware capabilities of each edge port and the features/properties required by each VLAN type. FIG. 3 depicts a flowchart 300 of such a provisioning algorithm according to an embodiment.

Starting with block 302, PNP component 114 can first determine the number of wireless VLANs, voice VLANs, and data VLANs that have been created on edge device 102 (per block 208 of FIG. 2). If there are one or more wireless VLANs but no voice or data VLANs, PNP component 114 can determine the number of edge ports that support PoE (block 304). PNP component 114 can then assign the PoE edge ports to the wireless VLANs (if there are multiple VLANs, the ports can be equally divided) (block 306).

If there are one or more wireless and data VLANs but no voice VLANs, PNP component 114 can determine the number of edge ports that support PoE (block 308). If the number of PoE edge ports is less than one-third of the total number of edge ports, PNP component 114 can assign the PoE edge ports to the wireless VLANs and the remainder of the edge ports to the data VLANs (block 310). On the other hand, if the number of PoE edge ports is greater than one-third of the total number of edge ports, PNP component 114 can assign four PoE edge ports to each wireless VLAN (subject to the restriction that the total number of wireless VLAN ports will not exceed one-third the total number of edge ports) and the remainder of the edge ports to the data VLANs (block 312).

If there are one or more wireless and voice VLANs, PNP component 114 can determine the number of edge ports that support PoE (block 314). If the number of PoE edge ports is less than one-third of the total number of edge ports, PNP component 114 can assign-one-fourth of the PoE edge ports to the wireless VLANs and the remainder of the PoE edge ports to the voice VLANs (block 316). On the other hand, if the number of PoE edge ports is greater than one-third of the total number of edge ports, PNP component 114 can assign four PoE edge ports to each wireless VLAN (subject to the restriction that the total number of wireless VLAN ports will not exceed one-third the total number of edge ports) and the remainder of the PoE edge ports to the voice VLANs (block 318). Further, if there are any data VLANs, PNP component 114 can assign the edge ports that are not wireless VLAN ports to the data VLANs (block 320).

If there are one or more voice VLANs but no wireless VLANs, PNP component 114 can determine the number of edge ports that support PoE (block 322). PNP component 114 can then assign the PoE edge ports to the voice VLANs (block 324). Further, if there are any data VLANs, PNP component 114 can assign the remaining edge ports to the data VLANs (block 326).

Finally, if there are one or more data VLANs but no wireless or voice VLANs, PNP component 114 can simply assign the edge ports to the data VLANs (block 328).

In the algorithm above, it is assumed that VLAN assignment for each edge port will start from the last available port on edge device 102. Further, if any of the calculations result in Per-VLAN-Port being less than one, it can be automatically set to one.

4. Network Switch/Router

Figure 4:
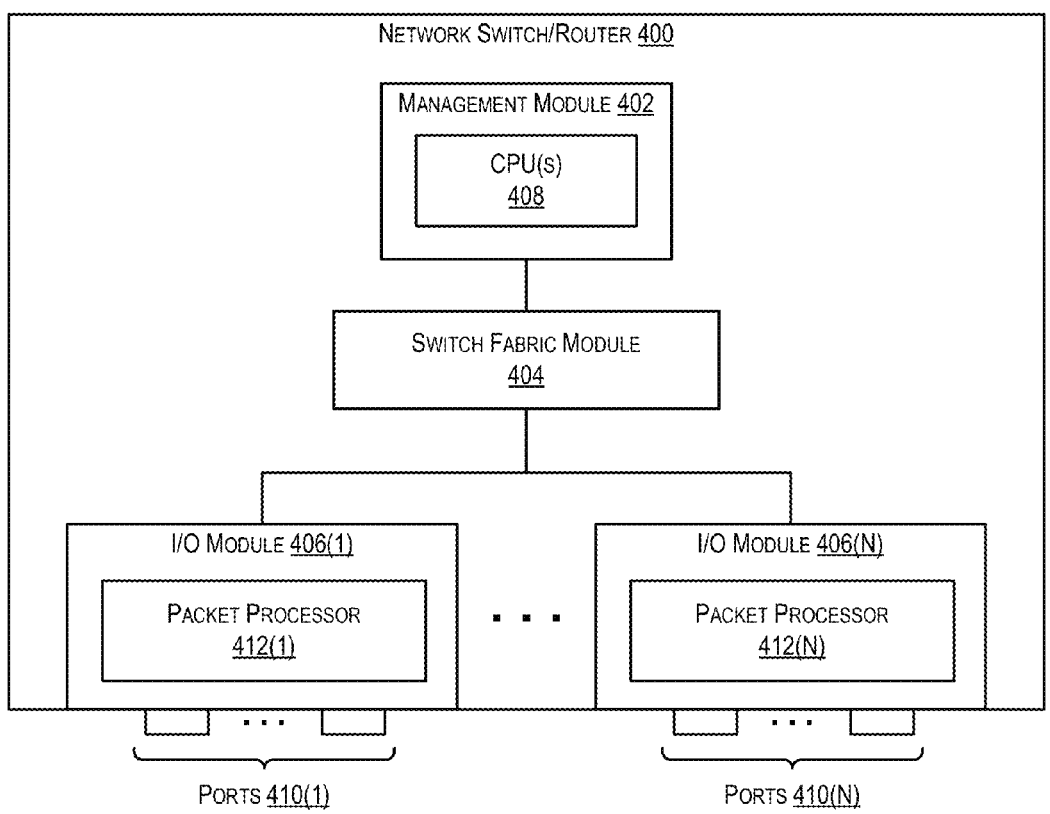
FIG. 4 depicts a network device according to an embodiment.

FIG. 4 is a simplified block diagram of an exemplary network switch/router 400 according to an embodiment. In certain embodiments, network switch/router 400 can be used to implement edge device 102 and/or core devices 106(1) and 106(2) of FIG. 1.

As shown, network switch/router 400 includes a management module 402, a switch fabric module 404, and a number of I/O modules 406(1)-406(N). Management module 402 represents the control plane of network switch/router 400 and includes one or more management CPUs 408 for managing/controlling the operation of the device. Each management CPU 408 can be a general purpose processor, such as a PowerPC, Intel, AMD, or ARM-based processor, that operates under the control of software stored in an associated memory (not shown).

Switch fabric module 404 and I/O modules 406(1)-406(N) collectively represent the data, or forwarding, plane of network switch/router 400. Switch fabric module 404 is configured to interconnect the various other modules of network switch/router 400. Each I/O module 406(1)-406(N) can include one or more input/output ports 410(1)-410(N) that are used by network switch/router 400 to send and receive data packets. As noted with respect to FIG. 1, ports 410(1)-410(N) can comprise edge ports for communicating with host devices, as well as uplink ports for communicating with core devices. Each I/O module 406(1)-406(N) can also include a packet processor 412(1)-412(N). Packet processor 412(1)-412(N) is a hardware processing component (e.g., an FPGA or ASIC) that can make wire speed decisions on how to handle incoming or outgoing data packets.

It should be appreciated that network switch/router 400 is illustrative and not intended to limit embodiments of the present invention. Many other configurations having more or fewer components than network switch/router 400 are possible.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   receiving, by a first network device, a Layer 2 discovery packet on an uplink port operable for connecting the first network device to a second network device;
   learning, by the first network device, virtual local area network (VLAN) information from the Layer 2 discovery packet, the VLAN information specifying one or more VLAN identifiers (IDs) and one or more VLAN types; and
   configuring, by the first network device, one or more ports of the first network device based on the VLAN information, the configuring comprising:
      creating one or more VLANs on the first network device based on the VLAN information, each of the one or more VLANs having a VLAN ID from the one or more VLAN IDs and a VLAN type from the one or more VLAN types; and
      assigning at least one port of the first network device to at least one VLAN in the one or more VLANs, the assigning taking into account a hardware capability of the at least one port and a feature supported by the VLAN type of the at least one VLAN.

2. The method of claim 1 wherein the VLAN types include one or more of a management VLAN, a data VLAN, a voice VLAN, and a wireless VLAN.

3. The method of claim 1 wherein the Layer 2 discovery packet is one of a Link Layer Discovery Protocol (LLDP) packet, a Foundry Discovery Protocol (FDP) packet, or a Cisco Discovery Protocol (CDP) packet.

4. The method of claim 1 wherein the second network device is a core device, and wherein the first network device is an edge device that communicatively couples the core device with one or more host devices.

5. The method of claim 1 wherein the one or more ports include the uplink port.

6. The method of claim 1 wherein the one or more ports include a plurality of edge ports of the first network device.

7. The method of claim 1 wherein the assigning comprises assigning the uplink port to at least one of the one or more VLANs.

8. The method of claim 1 wherein the assigning comprises assigning at least one of the plurality of edge ports to a VLAN in the one or more VLANs.

9. The method of claim 1 wherein the assigning comprises:
   determining a number of wireless VLANs, a number of voice VLANs, and a number of data VLANs in the one or more VLANs.

10. The method of claim 1 wherein the assigning comprises, if the one or more VLANs include one or more wireless VLANs but no voice or data VLANs:
    identifying ports in the one or more ports that support Power over Ethernet (PoE); and
    assigning the ports that support PoE to the one or more wireless VLANs.

11. The method of claim 1 wherein the assigning comprises, if the one or more VLANs include one or more wireless VLANs and one or more data VLANs but no voice VLANs:
    if one third or less of the one or more ports support PoE:
       assigning the ports that support PoE to the one or more wireless VLAN; and
       assigning the ports that do not support PoE to the one or more data VLANs; and
    if more than one third of the one or more ports support PoE:
       assigning four ports that support PoE to each wireless VLAN;
       assigning the remainder of the one or more ports to the one or more data VLANs.

12. The method of claim 1 wherein the assigning comprises, if the one or more VLANs include one or more wireless VLANs, one or more voice VLANs, and one or more data VLANs:
    if one third or less of the one or more ports support PoE:
       assigning one fourth of the ports that support PoE to the one or more wireless VLANs;
       assigning the remainder of the ports that support PoE to the one or more voice VLANs; and
       assigning the ports that do not support PoE to the one or more data VLANs; and
    if more than one third of the one or more ports support PoE:

assigning four ports that support PoE to each wireless VLAN;

assigning the remainder of the ports that support PoE to the one or more voice VLANs; and assigning the ports that do not support PoE to the one or more data VLANs.

13. The method of claim 1 wherein the assigning comprises, if the one or more VLANs include one or more voice VLANs and one or more data VLANs but no wireless VLANs:

identifying ports in the one or more ports that support PoE;

assigning the ports that support PoE to the one or more voice VLANs; and assigning the ports that do not support PoE to the one or more data VLANs.

14. The method of claim 1 wherein the configuring further comprises configuring one or more Layer 2 features of the first network device based on types of the one or more VLANs.

15. The method of claim 14 wherein the one or more Layer 2 features include Rapid Spanning Tree Protocol (RSTP), dual-mode port support, inline power, and Spanning Tree Protocol-Bridge Protocol Data Unit (STP-BPDU) guard.

16. The method of claim 1 further comprising:

downloading a global configuration file from a management server, the global configuration file including configuration settings applicable to a group of related network devices including the first network device; and applying the configuration file to the first network device.

17. The method of claim 1 further comprising:

receiving another Layer 2 discovery packet on the uplink port that includes one or more changes to the VLAN information; and re-assigning, based on the one or more changes, the at least one port to another VLAN in the one or more VLANs.

18. The method of claim 17 wherein the one or more changes include a change to the VLAN type of the at least one VLAN.

19. A non-transitory computer readable medium having stored thereon program code executable by a first network device, the program code comprising:

code that causes the first network device to receive a Layer 2 discovery packet on an uplink port operable for connecting the first network device to a second network device;

code that causes the first network device to learn virtual local area network (VLAN) information from the Layer 2 discovery packet, the VLAN information specifying one or more VLAN identifiers (IDs) and one or more VLAN types; and code that causes the first network device to configure one or more ports of the first network device based on the VLAN information the configuring comprising:

creating one or more VLANs on the first network device based on the VLAN information, each of the one or more VLANs having a VLAN ID from the one or more VLAN IDs and a VLAN type from the one or more VLAN types; and assigning at least one port of the first network device to at least one VLAN in the one or more VLANs, the assigning taking into account a hardware capability of the at least one port and a feature supported by the VLAN type of the at least one VLAN.

20. A network device comprising:

one or more ports including an uplink port for connecting the network device to another network device;

a processor; and a non-transitory computer readable medium having stored thereon executable program code which, when executed by the processor, causes the processor to:

receive a Layer 2 discovery packet on the uplink port;

learn virtual local area network (VLAN) information from the Layer 2 discovery packet, the VLAN information specifying one or more VLAN identifiers (IDs) and one or more VLAN types; and configure the one or more ports based on the VLAN information, the configuring comprising:

creating one or more VLANs on the network device based on the VLAN information, each of the one or more VLANs having a VLAN ID from the one or more VLAN IDs and a VLAN type from the one or more VLAN types; and assigning at least one port of the network device to at least one VLAN in the one or more VLANs, the assigning taking into account a hardware capability of the at least one port and a feature supported by the VLAN type of the at least one VLAN.

* * * * *